Patented June 25, 1946

2,402,824

UNITED STATES PATENT OFFICE 2,402,824

IRON BLUE PIGMENT AND METHOD OF MANUFACTURE

Edward W. Large, Reading, Pa., assignor, by mesne assignment, to American Cyanamid Company, New York, N. Y., a corporation of Maine No Drawing. Application January 17, 1944, Serial No. 518,583

6 Claims. (Cl. 106—304)

The present invention relates generally to iron blue pigments and particularly to iron blue pigments resistant to the action of alkalies.

Iron blue is ordinarily made by reacting a soluble ferrocyanide with a ferrous salt and oxidizing the resultant precipitate, or "white paste," as it is usually called, to ferric ferrocyanide. These colors are made in a range of shades or types by variations of temperature, concentration, acidity, etc., well known in the art. Iron blues have a wide range of application in the printing ink, paint and lacquer industries, but their principal disadvantage is their very poor resistance to alkalies. Even very weak alkalies tend to destroy the color and convert it into a muddy yellow compound.

I have discovered that iron blues can be made considerably more alkali resistant by incorporating in the pigment a substantial amount of a manganese compound. The preferred method consists of adding a solution of a manganese salt to the "white paste" during the process of manufacture, and thereafter proceeding with the process in the usual manner.

Following is a typical example of the manner of employing my invention:

460 lbs. of yellow prussiate of soda and 124 lbs. of ammonium sulphate are dissolved in 475 gallons of water at 180° F. To this solution is added with constant agitation a solution of 350 lbs. of copperas in 550 gallons of water at 180° F. and the resulting "white paste" is agitated for 15 minutes, holding the temperature at 180° F. Then a solution of 16 lbs. of manganese sulphate in 25 gallons of hot water is added and agitation continued for 15 minutes. 180 lbs. of 66° Baumé sulfuric acid is added slowly and the agitation continued for thirty minutes.

The "white paste" is then oxidized by the addition of a solution of 60 lbs. of bichromate of soda in 60 gallons of cold water, and the batch is stirred for two hours. The pigment is then washed free of acid in the usual manner, filtered, dried, and ground.

The resulting pigment is distinguished from ordinary iron blues by the fact that it has a very high degree of resistance to alkalies, and may be used for many purposes for which the ordinary iron blues are unsuited.

The standard method for testing the alkali resistance of iron blues is to first rub up the pigment with a lithograph varnish and then make a draw down in the regular way. These are allowed to thoroughly dry and are then immersed in a 1% sodium hydroxide solution for 15 minutes. Standard blue not treated to improve alkali resistance turns green or yellow under this test, whereas the pigments of the present invention are hardly affected.

Any soluble salt of manganese may be employed in place of manganese sulphate and the amount employed may be varied over a wide range without departing from the scope of the invention.

About 1% or more of the manganese salt produces an appreciable improvement in the alkali resistance of the pigment. Amounts in the range of 3 to 6% have been found to produce good results. More may be used if desired, but more than 10% will not ordinarily be used.

What I claim is:

1. An iron blue of improved alkali resistance, comprising a pigment ferric ferrocyanide containing from about 1 to 10% by weight of a manganese compound, uniformly distributed throughout the pigment by incorporation of a manganese salt during the manufacture of the pigment prior to acidification and oxidation of the "white paste."

2. The pigment of claim 1 in which the pigment ferric ferrocyanide is ammonium ferric ferrocyanide.

3. The method of improving the alkali resistance of iron blue, which comprises the preparation of a "white paste" of ferrous ferrocyanide, adding thereto about 1 to 10% by weight of a soluble salt of manganese, acidifying and oxidizing to a pigment ferric ferrocyanide.

4. The method of making alkali-resistant iron blues, which comprises reacting a soluble ferrocyanide with a soluble ferrous salt to form a precipitate, adding to the resultant precipitate about 1 to 10% by weight of a soluble salt of manganese, acidifying and oxidizing to a pigment ferric ferrocyanide.

5. The method of making alkali-resistant iron blues, which comprises reacting a soluble ferrocyanide with a soluble ferrous salt to form a precipitate, adding to the resultant precipitate about 1 to 10% by weight of a soluble salt of manganese, adding a mineral acid, and oxidizing to a pigment ferric ferrocyanide.

6. The method of making an alkali-resistant iron blue, which comprises reacting a solution of sodium ferrocyanide and ammonium sulphate with a solution of ferrous sulphate to form a precipitate, adding to the resultant precipitate a solution of about 1 to 10% by weight of manganese sulphate, adding sulfuric acid and oxidizing to a pigment ferric ferrocyanide with a solution of sodium bichromate.

EDWARD W. LARGE.